US012643830B1

(12) United States Patent
Sellappan

(10) Patent No.: US 12,643,830 B1
(45) Date of Patent: Jun. 2, 2026

(54) SLURRY COMPOSITION AND METHOD OF PRODUCING A CERAMIC MATRIX COMPOSITE WITH REDUCED MATRIX DEFECTS

(71) Applicant: Rolls-Royce High Temperature Composites Inc., Cypress, CA (US)

(72) Inventor: Pathikumar Sellappan, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 18/387,953

(22) Filed: Nov. 8, 2023

Related U.S. Application Data

(60) Provisional application No. 63/428,480, filed on Nov. 29, 2022.

(51) Int. Cl.
| | |
|---|---|
| *C04B 35/80* | (2006.01) |
| *C04B 35/628* | (2006.01) |
| *C04B 35/657* | (2006.01) |

(52) U.S. Cl.
CPC ........ *C04B 35/80* (2013.01); *C04B 35/62873* (2013.01); *C04B 35/62886* (2013.01); *C04B 35/657* (2013.01); *C04B 2235/3826* (2013.01); *C04B 2235/425* (2013.01); *C04B 2235/427* (2013.01); *C04B 2235/428* (2013.01); *C04B 2235/5244* (2013.01); *C04B 2235/5436* (2013.01); *C04B 2235/5472* (2013.01); *C04B 2235/616* (2013.01)

(58) Field of Classification Search
CPC ...................................................... C04B 35/80
See application file for complete search history.

(56) References Cited

U.S. PATENT DOCUMENTS

| | | | |
|---|---|---|---|
| 5,840,221 A | 11/1998 | Lau et al. | |
| 2001/0046563 A1 | 11/2001 | Nakamura et al. | |
| 2004/0191411 A1 | 9/2004 | Hornor et al. | |
| 2017/0313629 A1* | 11/2017 | Shim | C04B 35/584 |
| 2019/0185384 A1* | 6/2019 | Shim | C04B 35/657 |
| 2021/0069931 A1 | 3/2021 | Sellappan et al. | |

(Continued)

OTHER PUBLICATIONS

Corman et al., "SiC Fiber Reinforced SiC-Si Matrix Composites Prepared by the Melt Infiltration (MI) for Gas Turbine Engine Applications," Presented at the *International Gas Turbine & Aeroengine Congress & Exhibition*, Indianapolis, IN (1999), pp. 1-7.

(Continued)

*Primary Examiner* — Robert A Vetere
(74) *Attorney, Agent, or Firm* — Shumaker & Sieffert, P.A.

(57) ABSTRACT

A method of making a ceramic matrix composite includes infiltrating a fiber preform comprising silicon carbide fibers with a slurry comprising a liquid, silicon carbide particles, carbon particles, and silicon particles to form a slurry-infiltrated fiber preform. The slurry-infiltrated fiber preform is infiltrated with a molten material comprising silicon. Prior to or during the infiltration with the molten material, the silicon particles are melted. The molten material is cooled, and a ceramic matrix composite including a ceramic matrix reinforced with the silicon carbide fibers is formed, where the ceramic matrix is substantially devoid of dry slurry defects.

18 Claims, 1 Drawing Sheet

(56)         References Cited

U.S. PATENT DOCUMENTS

| 2021/0070663 | A1 | 3/2021 | Sellappan et al. |
| 2022/0081368 | A1 | 3/2022 | Zhang et al. |

OTHER PUBLICATIONS

Radhika et al., "A Review on Si-Based Ceramic Matrix Composites and their Infiltration Based Techniques," *Silicon*, 14 (2022), pp. 10141-10171.

* cited by examiner

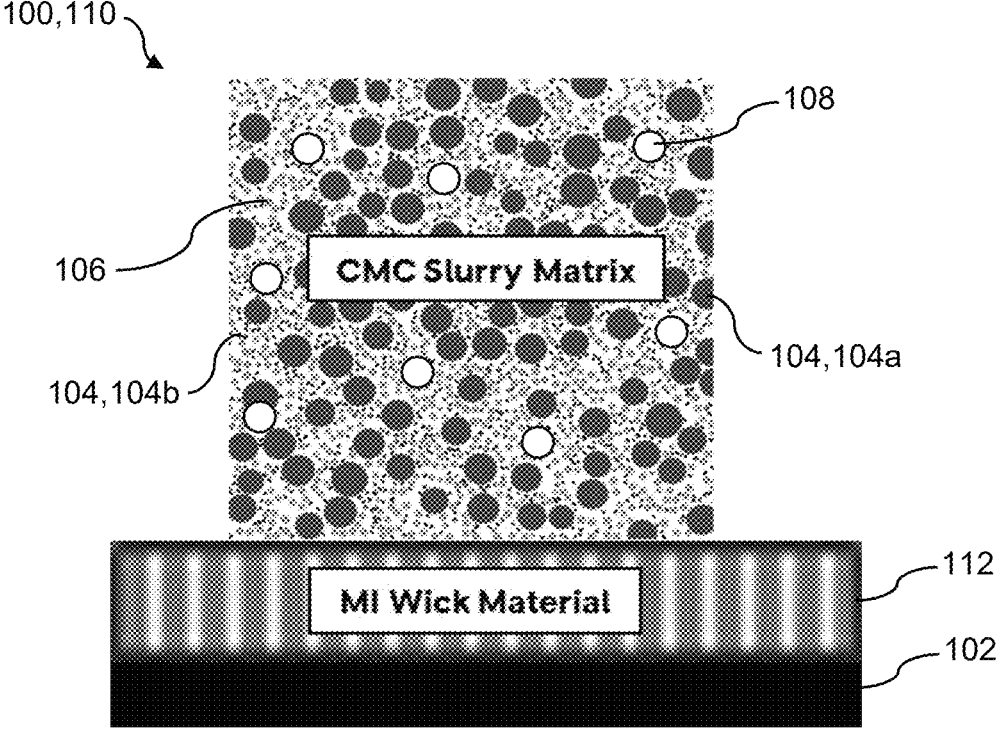

SLURRY COMPOSITION AND METHOD OF PRODUCING A CERAMIC MATRIX COMPOSITE WITH REDUCED MATRIX DEFECTS

RELATED APPLICATION

The present patent document claims the benefit of priority under 35 U.S.C. 119(e) to U.S. Provisional Patent Application No. 63/428,480, filed Nov. 29, 2022, and hereby incorporated by reference in its entirety.

TECHNICAL FIELD

This disclosure relates generally to fabrication of ceramic matrix composites and more particularly to a method for producing a ceramic matrix composite with reduced matrix (or "dry slurry") defects.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Improvements in the thrust and efficiency of gas turbine engines are linked to increasing turbine entry temperatures, which places a heavy burden on turbine engine components. Ceramic matrix composites (CMCs), which include ceramic fibers embedded in a ceramic matrix, exhibit a combination of properties that make them promising candidates for gas turbine engine components and other industrial applications that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of a SiC/SiC composite may include slurry infiltration of a SiC fiber preform followed by melt infiltration for densification.

CMC components may require few or no microstructural defects to meet their structural and service life requirements in harsh high-temperature environments. In some cases, what may be referred to as "dry slurry" defects may be found in the matrix phase even after full processing and densification of the CMC. Dry slurry defects may be described as pockets of slurry matrix materials that are not fully infiltrated by molten silicon during melt infiltration. These porous matrix defects may act as a crack initiation region and/or diffusion path for gaseous species during service in hot and humid environments. It would be beneficial to eliminate or reduce the amount of these "dry slurry" defects in the matrix to enhance the durability of the CMCs.

BRIEF DESCRIPTION OF THE DRAWINGS

The embodiments may be better understood with reference to the following drawing and description.

FIG. 1 is a schematic showing slurry-infiltrated fiber preform ready for melt infiltration.

DETAILED DESCRIPTION

Described in this disclosure is a novel slurry composition for ceramic matrix composite (CMC) fabrication. The slurry includes particles designed to melt during densification (e.g., melt infiltration) of a slurry-infiltrated fiber preform, thereby enabling more complete infiltration of the melt and reduction or elimination of dry slurry defects in the resulting CMC.

The slurry includes silicon carbide (SiC) particles, carbon particles, and silicon particles dispersed in a liquid. The silicon particles have a concentration in the slurry in a range from 0.5 vol. % to 2.5 vol. %. Before describing the inventive slurry in detail, an exemplary method of CMC fabrication is briefly explained so that the benefit of the slurry composition in minimizing dry slurry defects may be appreciated.

CMC fabrication may begin with formation of a fiber preform including continuous SiC fibers. The fiber preform may be produced by laying up plies comprising fiber tows arranged in a two- or three-dimensional weave, where each fiber tow includes a plurality of the continuous SiC fibers. The fiber preform may have the approximate shape of a CMC component to be produced. Before or after forming the fiber preform, an interface coating may be deposited on the continuous SiC fibers to provide a weak fiber-matrix interface once the CMC is formed, as this can be beneficial for fracture toughness. Typically, the interface coating includes one or more layers comprising boron nitride, silicon-doped boron nitride, and/or pyrolytic carbon. After the fiber preform is formed, a deposition method such as chemical vapor infiltration (CVI) may be employed to deposit a rigidization layer on the continuous SiC fibers (which are typically coated with the interface coating) to produce a rigidized fiber preform. The rigidization layer may comprise a matrix material, that is, a material such as SiC, which is intended to form part or all of the ceramic matrix of the CMC. After rigidization, a slurry comprising ceramic particles (e.g., SiC particles) and optionally reactive particles (e.g., carbon particles) dispersed in a liquid may be infiltrated into the rigidized fiber preform to form a green body, or a slurry-infiltrated fiber preform, which is loaded with particulate matter. The inventive slurry composition described in this disclosure further includes silicon particles. After slurry infiltration, some or all of the liquid from the slurry may be removed by drying. Typically, the slurry-infiltrated fiber preform includes a loading level of particulate matter from about 40 vol. % to about 65 vol. %, or from about 50 vol. % to 65 vol. %, with the remainder being porosity. To densify the slurry-infiltrated preform, a molten material comprising silicon may be infiltrated into the preform. This densification process, which is typically referred to as melt infiltration, is described in further detail below.

As indicated above, the slurry includes silicon particles at a concentration in a range from 0.5 vol. % to 2.5 vol. %. After drying, the concentration of the silicon particles may be from about 0.8 to about 4 vol. %. Before or during melt infiltration, the silicon particles 108, which are preferably uniformly dispersed throughout the slurry-infiltrated preform 110, as illustrated in FIG. 1, undergo melting and thus are able to react with the molten material and/or carbon particles during melt infiltration. If the concentration of silicon particles 108 in the slurry is too high, that is, greater than 2.5 vol. %, some silicon particles 108 may increase the amount of residual silicon in the resulting CMC. On the other hand, if the concentration in the slurry is too low, that is, less than 0.5 vol. %, the distribution of silicon particles 108 throughout the fiber preform 100 may not be sufficient to satisfactorily reduce or eliminate the dry slurry defects. The silicon particles 108 are preferably able to penetrate interstices of the fiber preform 100 during slurry infiltration so as to achieve the desired uniform distribution. Typically, the silicon particles 108 and the SiC particles 104 have a linear size in a range from about 1 μm to 40 μm, e.g., at least about 1 μm and/or about 20 μm or less, or about 15 μm or less, which is small enough to allow for penetration into the interstices of the fiber preform 100. The carbon particles 106, which may include diamond and/or graphite particles, may also have a linear size in a range from 1 μm to 25 μm, or from 1 μm to 15 μm, e.g., at least about 1 μm and/or about 10 μm or less, or about 5 μm or less. As shown schematically in FIG. 1, the carbon particles 106 may be finer in size than the silicon particles 108, and/or finer in size than at least a fraction of the SiC particles 106, e.g., from 1 μm to 10 μm in linear size. It is noted that "linear size" may refer to a nominal or average length or diameter of the particles, and the term "the particles" may refer to some or all of the silicon particles 108, some or all of the SiC particles 104, and/or some or all of the carbon particles 106.

In some examples, the particles may be substantially spherical. Alternatively, the particles may have an elongated, polygonal, or irregular shape. A bimodal or multimodal size distribution may be conducive to more efficient particle packing within the slurry and throughout the fiber preform. Accordingly, the particles may have a bimodal or multimodal size distribution. For example, as illustrated in FIG. 1, a first fraction 104a of the SiC particles 104 (or the silicon particles 108) may have a coarser or larger linear size, such as a linear size in a range from 10-50 μm, or from 10-20 μm, and a second fraction 104b of the SiC particles 104 (or the silicon particles 108) may have a finer linear size, such as a linear size in a range from 1-20 μm or from 0.5-3 μm.

The silicon carbide and carbon particles may have a collective concentration in the slurry in a range from about 60 vol. % to about 65 vol. %. Typically, the carbon particles in the slurry have a concentration of 5 vol. % or less, e.g., from 1 vol. % to 5 vol. %. The carbon particles may include diamond particles and/or graphite particles. Accordingly, a total solids content (or total content of the particulate materials in the slurry) may be up to about 68 vol. %. Preferably, the slurry has a viscosity of less than 1000 centipoise (cP) to allow for sufficient flowability during infiltration into the fiber preform. For example, the viscosity may be in a range from 200 cP to 700 cP, or from 200 cP to 600 cP.

The liquid is typically water or an aqueous solution, but may also or alternatively may include an organic solvent. For example, the liquid may include ethanol, methanol, isopropyl alcohol, methyl ethyl ketone, or toluene. The liquid may be selected to disperse the particulate material and/or disperse or dissolve any slurry additives, such as a dispersant or pre-gellant material. The optional slurry additive(s) may have a concentration in the slurry in a range from 1 vol. % to 4 vol. %.

A method of slurry infiltration that utilizes the slurry described in this disclosure is now described. The method includes infiltrating a slurry comprising a liquid, SiC particles 104, carbon particles 106, and silicon particles 108, into a fiber preform 100 comprising silicon carbide fibers. The silicon particles 108 may have a concentration in the slurry in a range from 0.5 vol. % to 2.5 vol. %. Typically, the silicon carbide fibers of the fiber preform 100 comprise continuous silicon carbide fibers having a length much longer than their width or diameter, e.g., the length may be on the order of tens or hundreds of centimeters, for example. To effect slurry infiltration, a vacuum may be applied to the fiber preform 100, which may be the rigidized fiber preform described above, prior to exposure to the slurry. During infiltration, the vacuum may be removed to create an external pressure (e.g., about 1 atm) that may enhance capillary forces and promote penetration of the slurry into the fiber preform 100, that is, impregnation of the fiber preform 100 with the slurry. The fiber preform 100 may be exposed to the slurry at room temperature (e.g., from about 15° C. to about 30° C.). After infiltration is complete, the slurry-infiltrated fiber preform 110 may be dried to remove (e.g., evaporate) some or all of the liquid from the slurry, while the infiltrated particles 104,106,108 remain in the preform 110. Drying may be carried out at room temperature or at an elevated temperature (e.g., from about 40° C. to about 150° C.). FIG. 1 shows a representation of a slurry-infiltrated fiber preform 110 which is ready for densification by melt infiltration. The slurry and the particles 104, 106,108 delivered into the fiber preform 100 may have any of the characteristics or properties described above or elsewhere in this disclosure.

A method of making a ceramic matrix composite that utilizes the slurry described in this disclosure is now described, again in reference to FIG. 1. The method includes infiltrating a fiber preform 100 including silicon carbide fibers with a slurry comprising a liquid, silicon carbide particles 104, carbon particles 106, and silicon particles 108, as described above. After slurry infiltration, the fiber preform 110 is infiltrated with a molten material 102 comprising silicon, and the silicon particles 108 in the fiber preform 110 undergo melting. The molten material (or "melt") 102 may consist essentially of silicon (e.g., elemental silicon and any incidental impurities) or may comprise a silicon-rich alloy. In examples where the molten material 102 comprises a silicon-rich alloy, the silicon particles 108 may melt at a different temperature than the silicon-rich alloy. Depending on the choice of alloying element(s) and the alloy composition, the melting temperature of the silicon-rich alloy may be higher than or lower than that of the silicon particles 108. Accordingly, melt infiltration is preferably carried out at a temperature at or above the melting temperature of the silicon-rich alloy and also the silicon particles 108. Typical temperatures for melt infiltration may range from about 1414° C. (melting temperature of silicon) to about 1500° C. Melt infiltration may be carried out without an external pressure, as capillary forces may drive the molten material 102 through interstices of the fiber preform 110. In some examples, a wick material 112, as illustrated in FIG. 1, may be used to promote infiltration of the molten material 102 into the slurry-infiltrated fiber preform 110. The wick material 112, which may comprise porous carbon or another suitable porous material, may be disposed between and in contact with the melt 102 and the fiber preform 110. Typically, melt infiltration is carried out for a time duration of several minutes to several hours, depending in part on the size and complexity of the preform 110 and, consequently, the component to be produced. Advantageously, the presence of the silicon particles 108, which are preferably uniformly distributed throughout the slurry-infiltrated fiber preform 110, ensures that molten material (from the melt 102 and/or the particles 108) can access all regions of the fiber preform 110. Upon cooling of the molten material, a ceramic matrix composite including a ceramic matrix reinforced with SiC fibers is formed, where the ceramic matrix comprises SiC and is substantially devoid of dry slurry defects. That is, the ceramic matrix may include a concentration of dry slurry defects that is less than 5 vol. %, and/or as low as 0 vol. %.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a slurry for ceramic matrix composite fabrication, the slurry comprising: a liquid; silicon carbide particles; carbon particles; and silicon particles, wherein the silicon particles have a concentration in the slurry in a range from 0.5 vol. % to 2.5 vol. %.

A second aspect relates to the slurry of the first aspect, wherein the silicon particles and/or the silicon carbide particles have a linear size in a range from about 1 micron to about 40 microns.

A third aspect relates to the slurry of the first or second aspect, wherein the silicon particles and/or the silicon carbide particles comprise a bimodal or multimodal size distribution.

A fourth aspect relates to the slurry of any preceding aspect, wherein the silicon carbide and carbon particles have a collective concentration in the slurry in a range from about 60 vol. % to about 65 vol. %.

A fifth aspect relates to the slurry of any preceding aspect, wherein the carbon particles are selected from the group consisting of diamond particles and graphite particles.

A sixth aspect relates to the slurry of any preceding aspect, wherein the liquid comprises water and/or an aqueous solution.

A seventh aspect relates to the slurry of any preceding aspect, having a viscosity of less than 1000 centipoise.

An eighth aspect relates to a method of slurry infiltration, the method comprising: infiltrating a slurry into a fiber preform comprising silicon carbide fibers, wherein the slurry comprises: a liquid; silicon carbide particles; carbon particles; and silicon particles, wherein the silicon particles have a concentration in the slurry in a range from 0.5 vol. % to 2.5 vol. %.

A ninth aspect relates to the method of the eighth aspect, wherein infiltrating the slurry comprises: exposing the fiber preform to a vacuum; contacting the fiber preform with the slurry; and removing the vacuum, thereby creating an external pressure to promote penetration of the slurry into the fiber preform (or impregnation of the fiber preform with the slurry).

A tenth aspect relates to the method of the eighth or ninth aspect, wherein the silicon particles are uniformly dispersed with the fiber preform.

An eleventh aspect relates to the method of any of the eighth through the tenth aspects, wherein the silicon carbide particles and/or the silicon particles have a bimodal or multimodal size distribution.

A twelfth aspect relates the method of any of the eighth through the eleventh aspects, wherein the liquid comprises water and/or an aqueous solution.

A thirteenth aspect relates to the method of any of the eighth through the twelfth aspects, wherein the silicon carbide and carbon particles have a collective concentration in the slurry in a range from about 60 vol. % to about 65 vol. %.

A fourteenth aspect relates to the method of any of the eighth through the thirteenth aspects, wherein the carbon particles are selected from the group consisting of diamond particles and graphite particles.

A fifteenth aspect relates to a method of making a ceramic matrix composite, the method comprising: infiltrating a fiber preform comprising silicon carbide fibers with a slurry comprising a liquid, silicon carbide particles, carbon particles, and silicon particles, thereby forming a slurry-infiltrated fiber preform; infiltrating the slurry-infiltrated fiber preform with a molten material comprising silicon; prior to or during the infiltration with the molten material, melting the silicon particles; and cooling the molten material, thereby forming a ceramic matrix composite including a ceramic matrix reinforced with the silicon carbide fibers, wherein the ceramic matrix is substantially devoid of dry slurry defects.

A sixteenth aspect relates to the method of the fifteenth aspect, wherein the ceramic matrix includes the dry slurry defects at a concentration in a range from 0 vol. % to 5 vol. %.

A seventeenth aspect relates to the method of the fifteenth or sixteenth aspect, wherein the silicon particles are uniformly dispersed throughout the fiber preform.

An eighteenth aspect relates to the method of any of the fifteenth through the seventeenth aspects, wherein the silicon particles have a concentration in the slurry in a range from 0.5 vol. % to 2.5 vol. %.

A nineteenth aspect relates the method of any of the fifteenth through the eighteenth aspects, wherein the molten material comprises a silicon alloy.

A twentieth aspect relates to the method of any of the fifteenth through the nineteenth aspects, wherein the silicon alloy has a melting temperature different from a melting temperature of the silicon particles.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of slurry infiltration, the method comprising:
infiltrating a slurry into a fiber preform comprising silicon carbide fibers, wherein the slurry comprises:
a liquid;
silicon carbide particles;
carbon particles; and
silicon particles,
wherein the silicon particles have a concentration in the slurry in a range from 0.5 vol. % to 2.5 vol. %, and wherein the silicon particles are uniformly dispersed throughout the fiber preform.

2. The method of claim 1, wherein infiltrating the slurry comprises:
exposing the fiber preform to a vacuum;
contacting the fiber preform with the slurry; and
removing the vacuum, thereby creating an external pressure to promote penetration of the slurry into the fiber preform.

3. The method of claim 1, wherein the silicon carbide particles and/or the silicon particles have a bimodal or multimodal size distribution.

4. The method of claim 1, wherein the liquid comprises water or an aqueous solution.

5. The method of claim 1, wherein the silicon carbide particles and the carbon particles have a collective concentration in the slurry in a range from about 60 vol. % to about 65 vol. %.

6. The method of claim 1, wherein the carbon particles are selected from the group consisting of diamond particles and graphite particles.

7. A method of making a ceramic matrix composite, the method comprising:

infiltrating a fiber preform comprising silicon carbide fibers with a slurry comprising a liquid, silicon carbide particles, carbon particles, and silicon particles, thereby forming a slurry-infiltrated fiber preform, wherein the silicon particles are uniformly dispersed throughout the fiber preform;

infiltrating the slurry-infiltrated fiber preform with a molten material comprising silicon;

prior to or during the infiltration with the molten material, melting the silicon particles; and cooling the molten material, thereby forming a ceramic matrix composite including a ceramic matrix reinforced with the silicon carbide fibers, wherein the ceramic matrix is substantially devoid of dry slurry defects.

8. The method of claim 7, wherein the ceramic matrix includes the dry slurry defects at a concentration in a range from 0 vol. % to 5 vol. %.

9. The method of claim 7, wherein the silicon particles have a concentration in the slurry in a range from 0.5 vol. % to 2.5 vol. %.

10. The method of claim 7, wherein the molten material comprises a silicon alloy.

11. The method of claim 10, wherein the silicon alloy has a melting temperature different from a melting temperature of the silicon particles.

12. A method of slurry infiltration, the method comprising:

infiltrating a slurry into a fiber preform comprising silicon carbide fibers, wherein the slurry comprises:

a liquid;

silicon carbide particles;

carbon particles; and silicon particles, wherein the silicon particles are uniformly dispersed throughout the fiber preform.

13. The method of claim 12, wherein the silicon particles and/or the silicon carbide particles have a linear size in a range from about 1 micron to about 40 microns.

14. The method of claim 12, wherein the silicon particles and/or the silicon carbide particles comprise a bimodal or multimodal size distribution.

15. The method of claim 12, wherein the silicon carbide particles and the carbon particles have a collective concentration in the slurry in a range from about 60 vol. % to about 65 vol. %.

16. The method of claim 12, wherein the carbon particles are selected from the group consisting of diamond particles and graphite particles.

17. The method of claim 12, wherein the liquid comprises water or an aqueous solution.

18. The method of claim 12, the slurry having a viscosity of less than 1000 centipoise.

* * * * *